United States Patent
Hausen et al.

(10) Patent No.: US 6,949,708 B1
(45) Date of Patent: Sep. 27, 2005

(54) FRICTIONALLY MOUNTED UTILITY SWITCH BOX MASKING COVER

(76) Inventors: Daniel M. Hausen, 19452 Perch Cir., Huntington Beach, CA (US) 92646; Eli Geoffrey Spehar, 19441 Perch Cir., Huntington Beach, CA (US) 92646

( * ) Notice: Subject to any disclaimer, the term of this patent is extended or adjusted under 35 U.S.C. 154(b) by 0 days.

(21) Appl. No.: 10/913,112

(22) Filed: Aug. 6, 2004

(51) Int. Cl.$^7$ .............................. H02G 3/14; H01H 9/20
(52) U.S. Cl. ..................... 174/66; D13/177; 200/43.11; 200/43.16; 200/43.21; 220/241
(58) Field of Search .............................. 174/48, 49, 53, 174/61, 65 R, 66–68; D8/353; 200/43.11, 43.16, 43.19, 43.21, 43.22; 220/3.2, 3.8, 241, 242; D13/177

(56) References Cited

U.S. PATENT DOCUMENTS

| | | | |
|---|---|---|---|
| 1,875,225 A | * | 8/1932 | Despard ................... 200/43.04 |
| 2,997,520 A | * | 8/1961 | Kinsman ..................... 174/67 |
| 3,061,083 A | | 10/1962 | Hubbell, Jr. |
| 3,204,807 A | * | 9/1965 | Ramsing ..................... 220/242 |
| D212,093 S | | 8/1968 | De Smidt |
| 3,491,327 A | * | 1/1970 | Goldwater, Jr. et al. .... 439/135 |
| 3,601,276 A | * | 8/1971 | Culpepper ................... 220/3.4 |
| 3,927,785 A | * | 12/1975 | Kinney et al. ................ 220/3.8 |
| 3,999,679 A | * | 12/1976 | Kalous ........................ 220/327 |
| 4,109,095 A | * | 8/1978 | Kling et al. ................... 174/67 |
| D279,860 S | * | 7/1985 | Schwalbe ...................... D8/14 |
| D286,739 S | | 11/1986 | Larsson |
| 5,063,872 A | | 11/1991 | Maus et al. |
| 5,195,901 A | * | 3/1993 | Correnti ...................... 439/147 |
| 5,301,437 A | | 4/1994 | Burke |
| 5,710,392 A | | 1/1998 | Bordwell et al. |
| 5,723,833 A | * | 3/1998 | Thrasher .................. 200/50.12 |
| 5,902,960 A | * | 5/1999 | Smith .......................... 174/66 |
| 6,279,768 B1 | * | 8/2001 | Mendoza et al. ........... 220/3.92 |
| 6,462,278 B1 | * | 10/2002 | Vrame ......................... 174/67 |
| 6,474,321 B1 | * | 11/2002 | Suckewer et al. ........... 123/620 |
| 6,538,202 B1 | * | 3/2003 | Shaffer et al. ................ 174/66 |
| 6,627,816 B1 | * | 9/2003 | Walker et al. ................. 174/66 |
| 6,681,948 B1 | * | 1/2004 | Santa Cruz et al. ......... 220/3.8 |
| 6,686,540 B2 | * | 2/2004 | Compagnone, Jr. .......... 174/58 |
| 6,723,922 B1 | * | 4/2004 | Shotey et al. ................. 174/66 |
| 6,803,522 B2 | * | 10/2004 | Skakun ........................ 174/66 |
| 2002/0157851 A1 | | 10/2002 | Compagnone, Jr. |
| 2003/0056968 A1 | | 3/2003 | Skakun |

* cited by examiner

Primary Examiner—Anthony Dinkins
Assistant Examiner—Adolfo Nino
(74) Attorney, Agent, or Firm—Gene Scott; Patent Law & Venture Group

(57) ABSTRACT

A switch and switch box masking cover is adapted for frictional mounting to the switch box when pressed into switch box in one orientation, and for frictional mounting to a toggle type of switch that is already mounted in the switch box, when the cover is pressed onto the switch in an alternate, reversed orientation. The masking cover is formed in continuous strips wherein one or more of the covers may be disconnected from the strip for use on a switch box of any size.

3 Claims, 4 Drawing Sheets

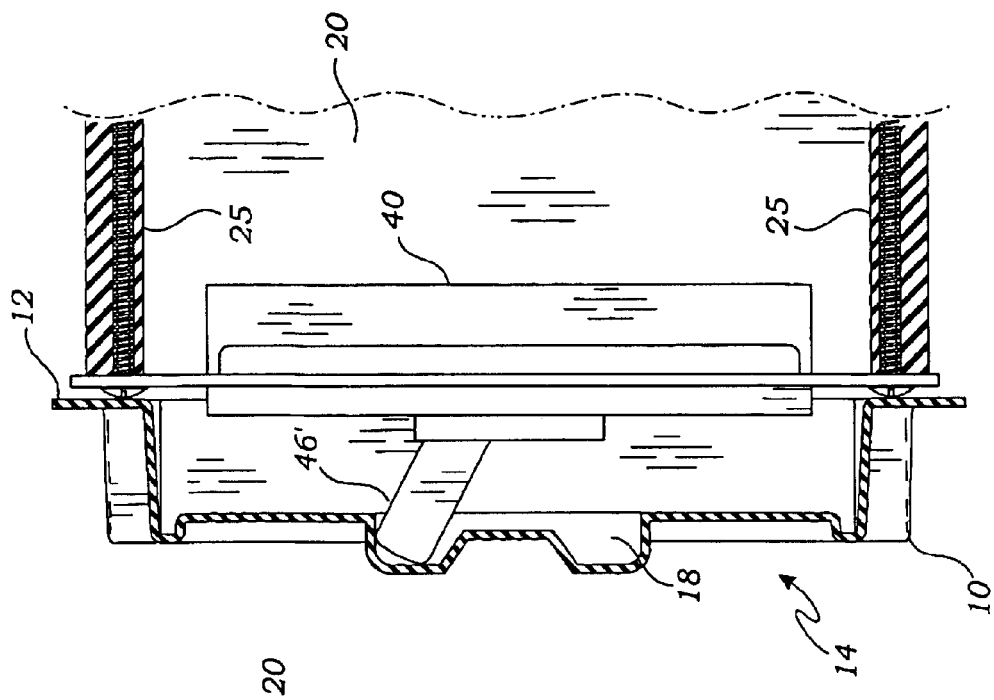

FRICTIONALLY MOUNTED UTILITY SWITCH BOX MASKING COVER

RELATED APPLICATIONS

Incorporation by Reference

Applicant hereby incorporates herein by reference, the U.S. patents and application publications referred to in the Description of Related Art section of this application and specifically U.S. Pat. Nos.: Des. 212,093; Des. 286,739; 3,061,083; 3,601,276; 5,063,872; 5,301,437; 5,710,392; 2002/0157851; 6,538,202; and 2003/0056968.

BACKGROUND OF THE INVENTION

1. Field of the Invention

This invention relates generally to painting masks and similar disposable covers, and more particularly to a switch box cover of molded construction and formed as a thin sheet with a depressed portion having a conformation that allows the cover to mask an empty switch box bay or a bay having a switch mounted therein. The invention further is related to the field of strip mounted units that are manually separable from the strip as one or more connected units.

2. Description of Related Art

The following art defines the present state of this field and each disclosure is hereby incorporated herein by reference:

De Smidt, U.S. Des. Pat. No. 212,093 discloses a design for an enclosure cover for an electric switch.

Larsson, U.S. Des. Pat. No. 286,739 discloses a design for a protective cover for low voltage equipment.

Hubbel, Jr., U.S. Pat. No. 3,061,083 discloses a protective covering for the open side of a wall box in a house wiring system in which an electric fixture has been mounted, said covering comprising a pair of laterally spaced side panels and an intermediate panel connected to the side panels by folded longitudinal edges, and an upwardly and inwardly extending tuck-in panel at the free edge of each of the side panels connected thereto by longitudinal folded edges and adapted to be inserted with their connected side panels in the wall box through the open front side thereof between the sides of the wall box and the fixture with the intermediate panel covering the front side of the fixture, and the tuck-in panels cooperating with the fixture to retain the intermediate panel in position over the fixture.

Cupepper, U.S. Pat. No. 3,601,276 discloses a removable protective cover for an electrical receptacle box or switch box in a building wall to protect the box against entry of plaster during plastering of the building wall, wherein the cover is formed as an integral body of deformable sheet material having a rectangular panel portion for covering the front opening of the box with its lateral edges fitting within the opening, and including extensions which cover the conventional mounting ears of the receptacle box and have bendable fastening means for fastening the cover to such mounting ears.

Maus et al., U.S. Pat. No. 5,063,872 discloses a device for protecting a fixture during treatment of the surface on which the fixture is mounted. The fixture itself includes internal elements mounted behind the surface and at least one surface element which is exposed at the surface. The fixture also would normally include a fixture cover mounted on the fixture to cover the internal elements of the fixture and to cover a portion of the surface around the periphery of the fixture, while permitting the surface elements of the fixture to be exposed. In order to protect such a fixture, a protective cover is provided for temporarily replacing the fixture cover during the treatment of the surface. The protective cover includes a portion to cover the internal elements of the fixture to protect them from the surface treatment and a portion to cover the surface elements of the fixture to also protect them from the surface treatment. In addition, an arrangement is provided for securing the protective cover to a predetermined element of the fixture by frictionally fitting said cover to said element. As a preferred embodiment of this, the arrangement for securing the protective cover includes an arrangement for frictionally fitting the cover to one of the surface elements.

Burke, U.S. Pat. No. 5,301,437 discloses a utility box insert for protecting the contents of the utility box during the installation of wallboard. The insert includes a base plate dimensioned to fit within the interior of a utility box, sidewalls extending upwardly from the sides of the plate, fastening tabs extending upwardly from the ends of the plate in order to hook over the edge of the utility box, and cut-outs cooperating with said fastening tabs in order to accommodate for mounting ears located on the utility box.

Bordwell et al., U.S. Pat. No. 5,710,392 discloses an improved electrical outlet box assembly includes an outlet box and a cover. The outlet box includes a bottom wall and a sidewall perimetrically bounding the bottom wall and an open upper end. The sidewall supports a pair of diametrically opposed ear lugs. Each ear lug has a pair of ears integrally formed therewith extending inwardly into the interior of the box. The ears secure a fastening element. The cover is removably frictionally engageable with the box and provides a closure for the open upper end of the box. The cover includes a generally planar surface with a pair of diametrically opposed dome-shaped protrusions extending from the top surface of the cover. The protrusions are positioned on the cover such that they align with the ears and accommodate the fastening elements therein. The cover further includes a pair of locking members extending from the bottom surface of the cover and which are frictionally engagable with the ears thereby holding the cover onto the outlet box.

Compagnone, Jr., U.S. Pat. No. 0,157,851 discloses a temporary protective cover for an electrical box having an open front end which includes in one embodiment a plate shaped to enclose the open front end and a pair of wings formed onto the plate for securing the cover onto the electrical box. A line of weakness extends across the rear surface of the plate from the right side edge to the left side edge. A plurality of posts are formed onto the rear surface of the plate and serve to limit movement of the cover when mounted onto the electrical box. The pair of wings are spaced adequately in from the left and right side edges of the plate and extend rearwardly from the rear surface of the plate at an angle away from one another. Each wing is shaped to include a flexible leg and an enlarged foot, the foot including a tapered guiding surface and a substantially flat engagement surface.

Shaffer et al., U.S. Pat. No. 6,538,202 discloses a cover for an electrical outlet box which eliminates the step of cleaning mud, dust, and paint from within the electrical outlet box and from on the made up wires within the electrical outlet box. The cover has a frontal opening, a sidewall surrounding the frontal opening, and opposite screw openings, comprising: a front side portion, a rear side portion, and a peripheral edge portion dimensioned to cover the frontal opening; and, two pegs which extend rearwardly from the rear side portion of the cover, positioned and sized to matingly seat within the screw openings so that the cover may be held over the central opening. In a preferred embodiment of the invention the cover further includes an inwardly recessed central portion, said central portion having an outwardly extending rib so that the cover may be pulled forwardly off the outlet box thereby. The recessed central portion has a rearwardly extending sidewall, opposite portions of which are sized to fit tightly within the interior frontal opening of the electrical outlet box so that the cover may be positioned and secured over the frontal opening thereby.

Skakun, U.S. Pat. No. 0,056,968 discloses embodiments of an invention having a rim, a deck and a raised portion on the deck to accommodate switch levers and television cable connectors. The rim fits closely around the perimeter of a cover plate and switch or outlet being shielded. The deck is generally parallel to the surface of the cover. Adhesive is applied to areas of the under surface of the deck which overlie the relatively smooth end areas of the cover plate. The shield has flexibility allowing for deflection under finger pressure to bring the adhesives into contact with the cover plate to securely attache the shield to the cover plate. Our prior art search with abstracts described above teaches masking covers of various types including molded or formed covers for switch boxes and the like. However, the prior art fails to teach such a cover configured for alternative frictional mounting onto the face of a switch box, onto the sides of a switch already mounted in the switch box, or onto a bat of a such a switch. The prior art also fails to teach the use of joined covers that may be separated into sets of one, two or more to cover switch boxes capable of accepting plural switches.

The present invention fulfills these needs and provides further related advantages as described in the following summary.

SUMMARY OF THE INVENTION

The present invention teaches certain benefits in construction and use which give rise to the objectives described below.

During the construction and fitting of new buildings, and the remodeling of existing structures, it is most often necessary to mount switches for lighting and other electrical needs. Such switches are usually mounted on wall surfaces for convenient access and then wired within the wall to lighting fixtures. To accomplish this, switch boxes are fastened to studs in the walls and these boxes present an open face to the room's interior during certain phases of construction. Pointedly, such boxes are subject to inadvertently receiving wall finishing materials that are placed on walls surrounding the boxes. Materials such as wall surfacing "mud," paint, wallpaper, wallpaper adhesive and many other items may contaminate open switch boxes. When electrical switches are mounted and wired in open switch boxes, the problem is compounded. Workers know that such boxes must be covered or masked-off in order to prevent excessive time and expense during final cleanup of the work site.

A common approach to masking switch boxes is to simply apply masking tape to the exposed surfaces that need to be covered. However, this is a time consuming approach and usually results in residual tape and glue being left behind when the interior walls are finished. The prior art described above provides further, more elegant solutions. However, none of the approaches that are in practice or that are known in the literature provide a complete solution to this problem. This is because, what is needed is a mask that is easily applied without adhesives or tools, that is able to quickly mount to an open box of any width, and just as easily is able to mount to both the older small bat toggle switches that have been used until recently, as well as the newer type flat, wide toggle switches. Such a mask must be inexpensive, easily stored, handled and used; and conveniently, properly and economically discarded after use.

The present invention meets these needs and requirements. In a preferred embodiment of the present invention, a switch box of one or more switch bays, and with one or more toggle switches mounted in it is masked by a disposable cover. The cover is formed of a thin biodegradable plastic sheet material, in strips which may be handled as individual strips of 10 or 12 covers, for instance, or a single longer strip may be formed into a coil that is used to dispense individual covers for a single switch, or multiple joined covers for a switch box having space for plural switches. Typically, switch boxes are manufactured with space for from one to as many as six switchs, i.e., bays or positions for mounting up to six switches in side-by-side positions are provided. One novel aspect of the present masking cover is that it is formed in such manner that it is able to be pressed into frictional engagement with an empty switch box when oriented so as to press a depression part of the cover into the interior of the switch box, or into frictional engagement with a toggle switch by reversing the cover so that the depression of the cover is facing outwardly. For the older type of toggle switch, the depression grips the switches' bat, and for the newer type of flat toggle switch, the depression grips the switch on opposing sides. Details of this configuration and of is interfacing with the switch box and with the two types of switches will be described herein, however, the instant invention is adaptable and may be used for any type of utility box including electrical, data, phone and thermostate.

A primary objective of the present invention is to provide an apparatus and method of use of such apparatus that yields advantages not taught by the prior art.

Another objective of the invention is to provide a masking cover that is able to frictionally engage a switch box or a switch mounted in the switch box by simply reversing the orientation of the cover.

A further objective of the invention is to provide such covers in a strip which may be easily severed to detach one, two, or more of the covers for placement over a switch box having one or more switch positions or bays.

A still further objective of the invention is to manufacture the masking cover of a inexpensive material so that it is economically discarded after use.

A still further objective of the invention is to manufacture the masking cover of a material that is biodegradable so that the discarding of used units does not negatively impact the environment.

Other features and advantages of the embodiments of the present invention will become apparent from the following more detailed description, taken in conjunction with the accompanying drawings, which illustrate, by way of example, the principles of at least one of the possible embodiments of the invention.

BRIEF DESCRIPTION OF THE DRAWINGS

The accompanying drawings illustrate at least one of the best mode embodiments of the present invention. In such drawings:

FIG. 6 is a partial sectional view taken along line 6—6 in FIG. 5;

FIG. 7 is a partial sectional view taken along line 7—7 in FIG. 5; and

FIG. 8 is a partial sectional view taken along line 8—8 in FIG. 5.

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 4:
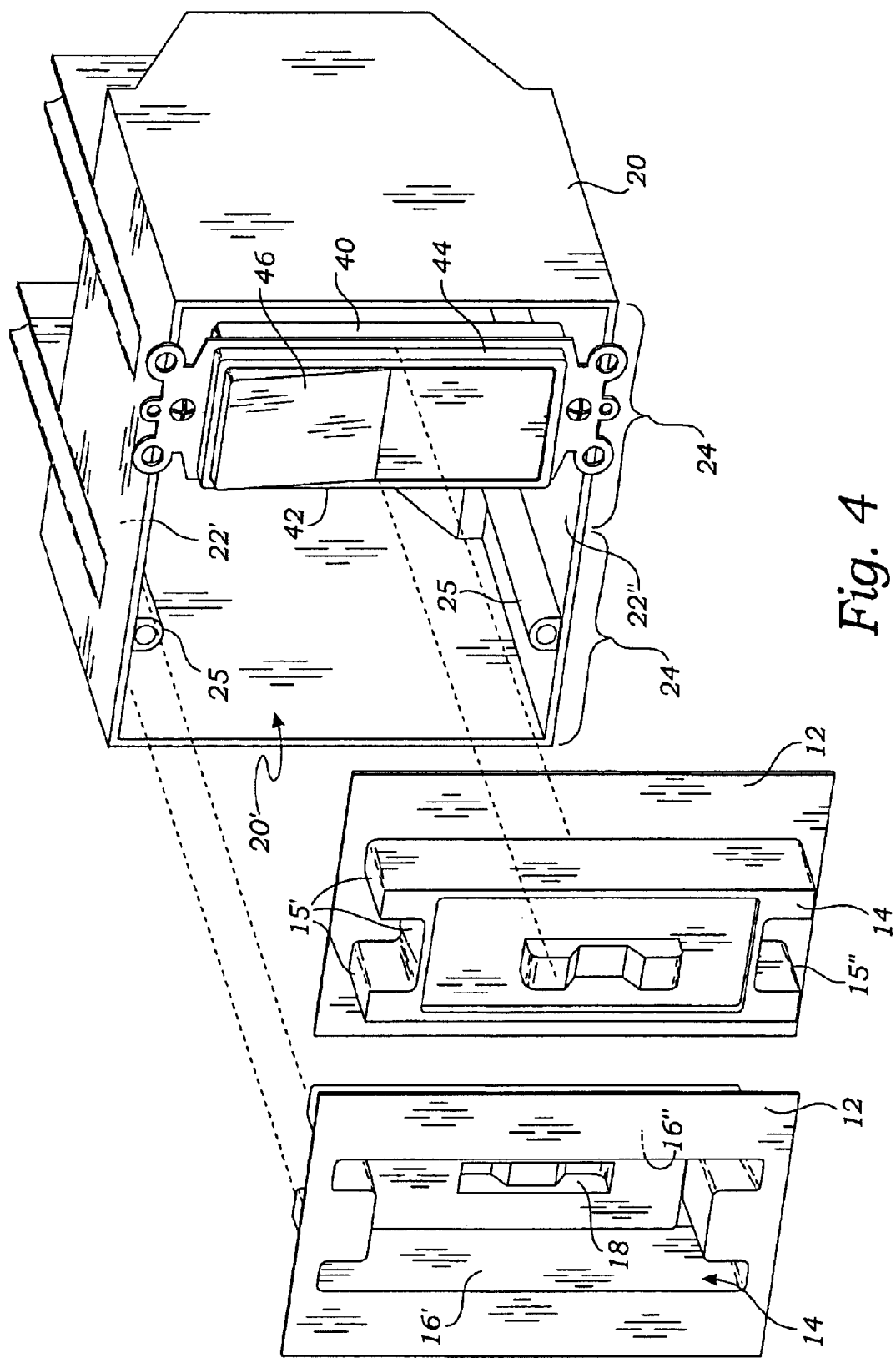
FIG. 4 is an exploded perspective view of a pair of the covers positioned for covering a switch box having an open space and a space occupied by a switch.
Figure 5:
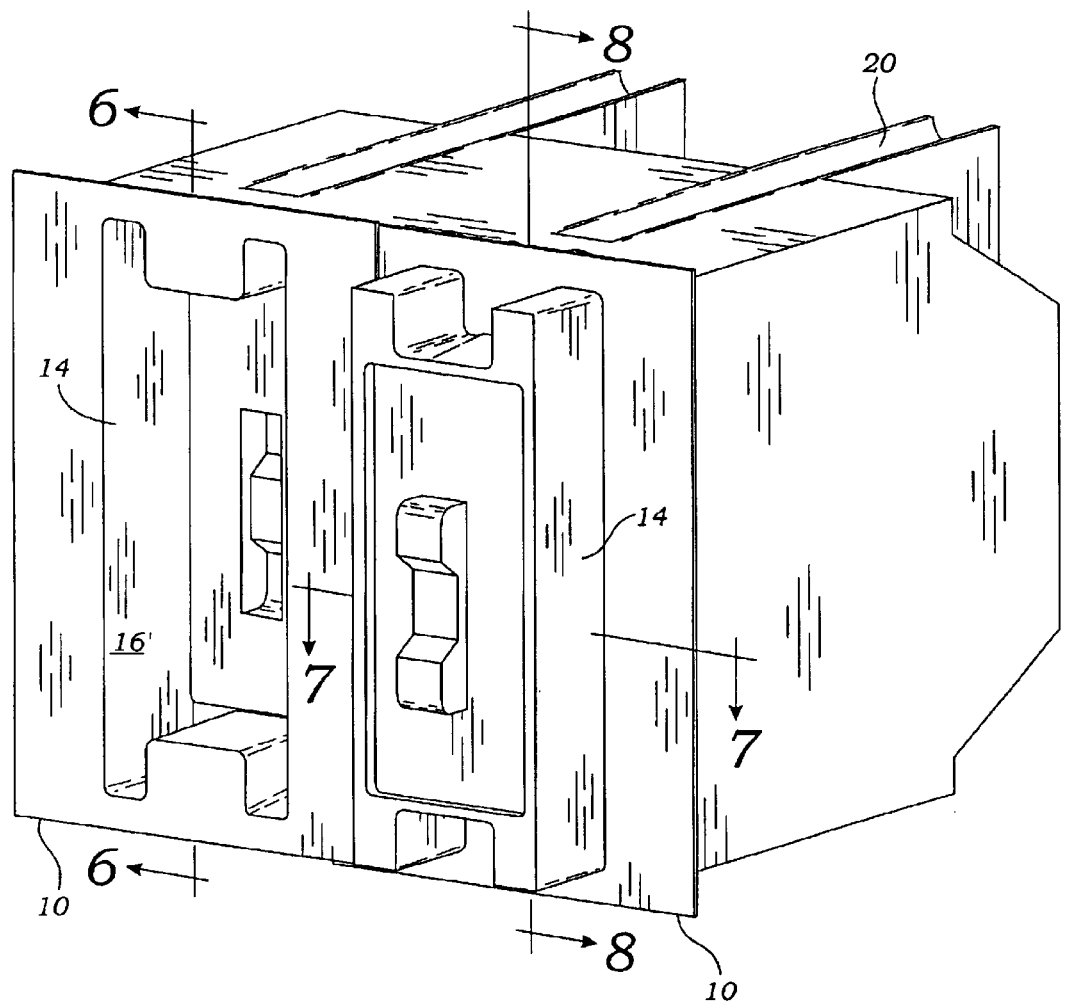
FIG. 5 is a perspective view of the switch box and covers shown in FIG. 4, as engaged.

In one embodiment of the present invention a cover 10 is fabricated of thin, somewhat flexible, sheet plastic and used for covering the open face 20' of a switch box 20 where the switch box 20 is of a type having: (1) upper 22' (FIG. 6) and lower 22" opposing interior surfaces, (2) at least one switch bay 24, and (3) an enablement 25, such as the bosses shown in FIGS. 4, 6 and 8, for mounting at least one switch 40. The figures show a switch box 20 having two bays 24 (spaces for mounting two switches), but such boxes 20 may have one bay or as many as six or more such bays 24, so that the drawings should be taken as only one possibility of many. Preferably, the switch 40 is of a type having left 42 and right 44 (FIG. 7) opposing exterior side surfaces (part of the switch housing) which protrude slightly forward and outward from the face 20' of the switch box 20, and a toggle bat 46 of either the wide type shown in FIGS. 4 and 7, or the older, well known narrower version, shown in FIG. 8. The cover 10 comprises a planar sheet portion 12 extensive for covering one switch bay 24 of the switch box 20, and a depressed portion 14 formed integrally with the planar sheet portion 12. The depressed portion 14 provides upper 15' and lower 15" angled exterior surfaces of such size and shape as to establish an interference fit with the upper 22' and lower 22" interior surfaces of the switch box 20 when the depressed portion 14 of the cover 10 is jammed into the switch box 20, for engaging the cover 10 over one bay 24 of the switch box 20 with the planar portion 12 covering the switch bay 24 as shown in FIG. 5 at the left. This is also shown in detail in FIG. 6. The depressed portion 14 further provides left 16' and right 16" interior surfaces (FIGS. 4 and 7) positionable for an interference-type fit with the left 42 and right 44 opposing exterior side surfaces of the switch 40 when the depressed portion 14, facing outwardly, as shown in FIG. 4 on the right, and FIG. 7, is jammed over the switch 40, as shown on the right side in FIG. 5, for engaging the cover 10 over one switch bay 24 of the switch box 20, with the planar portion 12 covering the switch bay 24. For use with the older style of toggle switches with the smaller narrower toggle bats, the depressed portion 14 provides a bat groove 18, see FIGS. 4 and 8, which is configured and sized for forming an interference fit with such a narrow type of toggle bat 46' when the bat groove 18 is jammed over the bat for engaging the cover 10 over one switch bay 24 of the switch box 20 with the planar portion 12 covering the switch bay 24. The frictional fit of the cover 10, in any one of the engagements described, is easily defeated by simply pulling the cover 10 off the switch box 20 or the switch 40 when a masking function is no longer needed. The switch box 20 and its switches 40 are found then to be in clean and non-soiled condition, ready to receive a switch or switch cover plate without the necessity of further cleaning.

Figure 1:
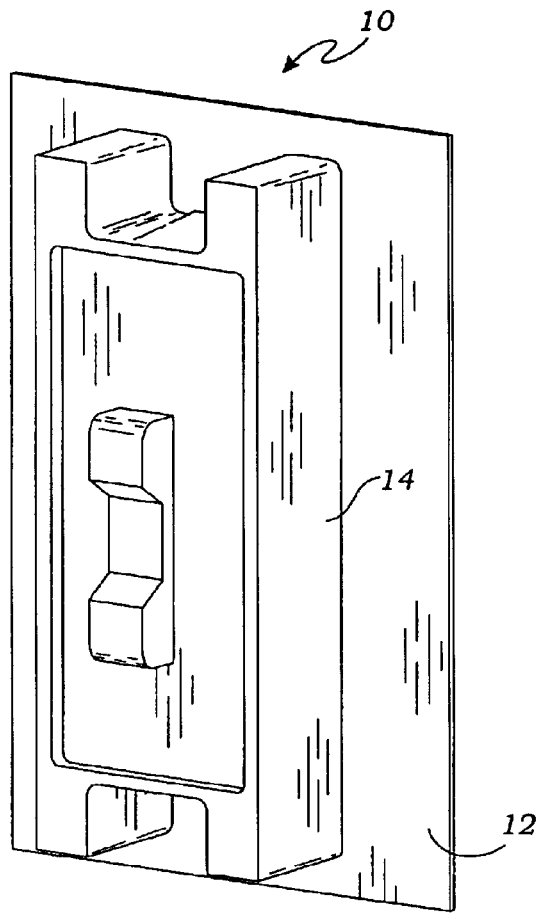
FIG. 1 is a frontal perspective view of one embodiment of a cover of the present invention.
Figure 2:
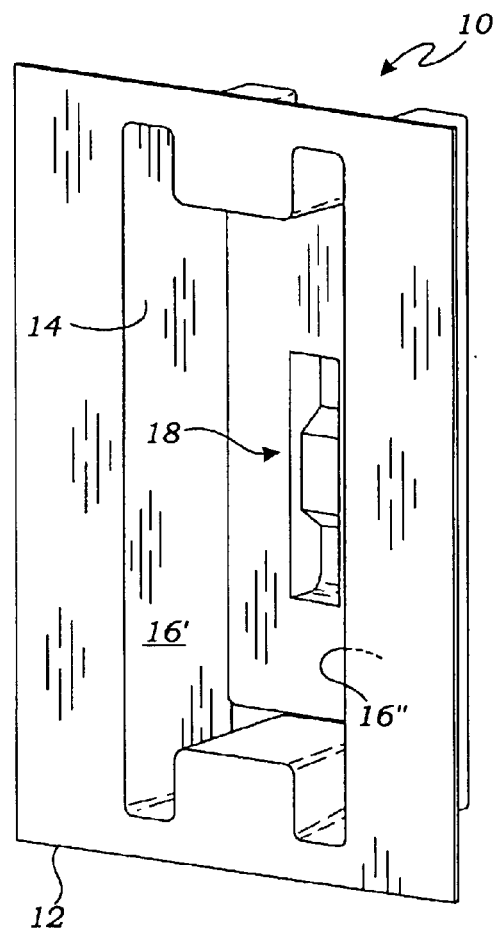
FIG. 2 is a rear perspective view thereof.
Figure 3:
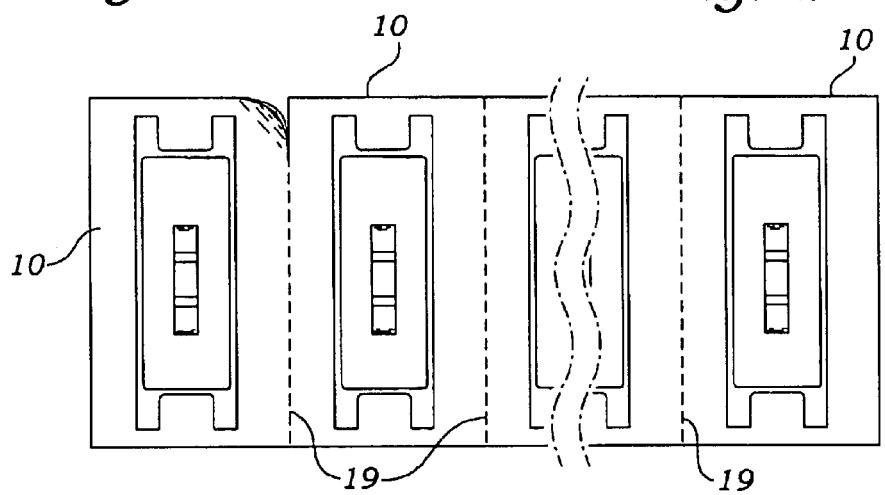
FIG. 3 is a front elevational view of a strip of the covers shown joined at perforations.

The cover 10 described above and shown in FIGS. 1, 2 and 3 may be formed as a strip 5 of individual switch box covers 10 as shown in FIG. 3. The covers 10 may be joined at perforations 19 enabling one or more of the covers to be separated from the strip 5 for covering a switch box 20 with plural bays 24 in the same manner as described above. Clearly, a switch box 20 that has plural bays 24 may have less switches 40 mounted than there are bays 24 so that the covers 10 may be engaged with the switch box 20 and the resident switches 40 in a manner shown in FIG. 5 where we see the cover 10 engaged with the switch box 20 at the left in the figure, and with the switch 40 on the right. To accomplish this level of adaptability, the cover 10 is configured to mount to the switch 40 just as easily as it mounts to the switch box 20 by simply reversing the orientation of the cover 10.

When the present invention is used in other applications, the size, shape and means of engagement with utility boxes may differ from the above, but the principals defined herein shall still apply.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

what is claimed is:

1. For covering a switch box of a type having upper and lower opposing interior surfaces, at least one switch bay, and an enablement for mounting at least one switch of a type having left and right opposing exterior side surfaces and a toggle bat; a cover comprises: a planar sheet portion extensive for covering one switch bay of the switch box; and a depressed portion formed contiguously with the planar sheet portion; the depressed portion providing upper and lower angled exterior surfaces for establishing an interference fit with the upper and lower interior surfaces of the switch box when the depressed portion of the cover is jammed into the switch box, for engaging the cover over one bay of the switch box with the planar portion covering the switch bay; the depressed portion further providing left and right interior surfaces positionable for an interference fit with the left and right opposing exterior side surfaces of the at least one switch when the depressed portion of the cover is jammed over the switch, for engaging the cover over one switch bay of the switch box with the planar portion covering the switch bay; the depressed portion still further providing a bat groove, the bat groove for forming an interference fit with the toggle bat when the bat groove is jammed over the toggle bat of the switch, for engaging the cover over one switch bay of the switch box with the planar portion covering the switch bay.

2. For covering a switch box of a type having upper and lower opposing interior surfaces, at least one switch bay, and an enablement for mounting at least one switch of a type having left and right opposing exterior side surfaces and a toggle bat; a strip of identical covers joined at perforations wherein at least one of the covers may be separated from the strip at one of the perforations; each of the covers comprising: a planar sheet portion extensive for covering one switch bay of the switch box; and a depressed portion formed contiguously with the planar sheet portion; the depressed portion providing upper and lower angled exterior surfaces for establishing an interference fit with the upper and lower interior surfaces of the switch box when the depressed portion of the cover is jammed into the switch box, for engaging the cover over one bay of the switch box with the planar portion covering the switch bay; the depressed portion further providing left and right interior surfaces positionable for an interference fit with the left and right opposing exterior side surfaces of the at least one switch when the depressed portion of the cover is jammed over the switch, for engaging the cover over one switch bay of the switch box with the planar portion covering the switch bay; the depressed portion still further providing a bat groove, the bat groove for forming an interference fit with the toggle bat when the bat groove is jammed over the toggle bat of the switch, for engaging the cover over one switch bay of the switch box with the planar portion covering the switch bay.

3. A strip of individual switch box covers, the covers joined at perforations enabling one or more of the covers to be separated from the strip for covering a switch box of a type having upper and lower opposing interior surfaces, at least one switch bay, and an enablement for mounting at least one switch of a type having left and right opposing exterior side surfaces and a toggle bat; each of the covers comprising: a planar sheet portion extensive for covering one switch bay of the switch box; and a depressed portion formed contiguously with the planar sheet portion; the depressed portion providing upper and lower angled exterior surfaces for establishing an interference fit with the upper and lower interior surfaces of the switch box when the depressed portion of the cover is jammed into the switch box, for engaging the cover over one bay of the switch box with the planar portion covering the switch bay; the depressed portion further providing left and right interior surfaces positionable for an interference fit with the left and right opposing exterior side surfaces of the at least one switch when the depressed portion of the cover is jammed over the switch, for engaging the cover over one switch bay of the switch box with the planar portion covering the switch bay; the depressed portion still further providing a bat groove, the bat groove for forming an interference fit with the toggle bat when the bat groove is jammed over the toggle bat of the switch, for engaging the cover over one switch bay of the switch box with the planar portion covering the switch bay.

* * * * *